(12) United States Patent
Ishizaki et al.

(10) Patent No.: US 12,160,142 B2
(45) Date of Patent: Dec. 3, 2024

(54) ROTATING ELECTRICAL MACHINE WITH STATOR WITH ANNULAR SHAPED MEMBERS BETWEEN FRAME AND STATOR CORE AND HAVING INTEGRATED CONTROL DEVICE FOR VEHICLES

(71) Applicant: Mitsubishi Electric Corporation, Tokyo (JP)

(72) Inventors: Mitsunori Ishizaki, Tokyo (JP); Takayuki Nakao, Tokyo (JP); Takashi Yamamoto, Tokyo (JP); Toshihiro Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 664 days.

(21) Appl. No.: 17/283,755

(22) PCT Filed: Dec. 19, 2018

(86) PCT No.: PCT/JP2018/046773
§ 371 (c)(1),
(2) Date: Apr. 8, 2021

(87) PCT Pub. No.: WO2020/129177
PCT Pub. Date: Jun. 25, 2020

(65) Prior Publication Data
US 2021/0384804 A1    Dec. 9, 2021

(51) Int. Cl.
*H02K 11/30*    (2016.01)
*H02K 1/2791*   (2022.01)
*H02K 3/52*     (2006.01)

(52) U.S. Cl.
CPC ......... *H02K 11/30* (2016.01); *H02K 1/2791* (2022.01); *H02K 3/522* (2013.01)

(58) Field of Classification Search
CPC .......... H02K 1/185; H02K 1/18; H02K 1/182; H02K 5/04; H02K 5/24; H02K 7/09;
(Continued)

(56) References Cited

U.S. PATENT DOCUMENTS 1,703,087 A * 2/1929 Daun ............... H02K 1/185
                                              310/216.118
1,771,475 A * 7/1930 Wright ............ H02K 1/185
                                              310/407

(Continued)

FOREIGN PATENT DOCUMENTS

CN   106687344 A   5/2017
JP   10-174356 A   6/1998
(Continued)

OTHER PUBLICATIONS

International Search Report for PCT/JP2018/046773 dated Mar. 26, 2019 (PCT/ISA/210).
(Continued)

*Primary Examiner* — Maged M Almawri
(74) *Attorney, Agent, or Firm* — Sughrue Mion, PLLC; Richard C. Turner (57) ABSTRACT

For the purpose of preventing damage to the frame when assembling the stator, improving the holding force for holding the stator, and making it possible to reduce the size of the rotating electrical machine body in the radial direction, the rotating electrical machine with integrated control device for vehicles integrates the rotating electrical machine main body and the control device arranged on the rear side of the rotating electrical machine main body and controlling the rotating electrical machine, the rotating electrical machine main body provides a first annular shape member located between the stator and the frame, a second annular shape member located between the and the first annular shape member, the stator is press-fitted into the frame via the
(Continued)

first annular shape member and the second annular shape member.

21 Claims, 10 Drawing Sheets

(58) Field of Classification Search
CPC . H02K 11/30; H02K 5/00; H02K 5/06; H02K 5/08; H02K 5/10; F16C 32/047
USPC .... 310/89, 88, 415, 431–433, 427, 216.127, 310/216.129
See application file for complete search history.

(56) References Cited

U.S. PATENT DOCUMENTS

| | | | | |
|---|---|---|---|---|
| 1,795,882 | A * | 3/1931 | Noden | H02K 1/185 310/216.049 |
| 2,001,799 | A * | 5/1935 | Seyfried | H02K 1/185 310/414 |
| 2,023,259 | A * | 12/1935 | Anderson | H02K 1/185 310/426 |
| 2,478,316 | A * | 8/1949 | Potter | H02K 1/185 310/216.127 |
| 2,523,520 | A * | 9/1950 | Reinhard | H02K 1/185 310/410 |
| 2,711,492 | A * | 6/1955 | Ballman | H02K 1/185 164/109 |
| 2,876,371 | A * | 3/1959 | Wesolowski | H02K 1/16 310/216.049 |
| 2,939,021 | A * | 5/1960 | Gilchrist | H02K 1/185 310/91 |
| 2,977,491 | A * | 3/1961 | Hueffed | H02K 1/185 310/414 |
| 4,765,054 | A * | 8/1988 | Sauerwein | H02K 3/522 310/216.115 |
| 5,767,602 | A * | 6/1998 | Sargeant | H02K 5/207 310/58 |
| 5,796,190 | A * | 8/1998 | Takeda | H02K 1/32 310/156.31 |
| 6,346,760 | B1 * | 2/2002 | Boardman, IV | H02K 1/16 310/216.118 |
| 6,498,417 | B2 * | 12/2002 | Fuller | H02K 1/185 310/431 |
| 6,720,699 | B1 * | 4/2004 | Shah | H02K 1/16 310/182 |
| 6,856,064 | B2 * | 2/2005 | Masumoto | H02K 1/165 310/216.008 |
| 7,653,986 | B2 * | 2/2010 | Majernik | H02K 1/185 29/598 |
| 7,847,444 | B2 * | 12/2010 | Kingman | H02K 5/203 310/91 |
| 7,928,617 | B2 * | 4/2011 | Tsukashima | H02K 7/20 310/51 |
| 9,496,765 | B2 * | 11/2016 | Zheng | H02K 1/185 |
| 10,594,198 | B2 * | 3/2020 | Nakano | H02K 11/21 |
| 10,715,006 | B2 * | 7/2020 | Bender | H02K 7/025 |
| 10,749,402 | B2 * | 8/2020 | Ohashi | H02K 5/04 |
| 10,855,134 | B2 * | 12/2020 | Ishii | H02K 7/083 |
| 10,958,138 | B2 * | 3/2021 | Kaneko | H02K 5/161 |
| 11,658,525 | B2 * | 5/2023 | Coppola | H02K 15/028 310/54 |
| 2004/0217669 | A1 * | 11/2004 | Fujii | H02K 1/148 310/216.045 |
| 2005/0077789 | A1 * | 4/2005 | Kusumoto | H02K 19/36 310/68 B |
| 2006/0071574 | A1 * | 4/2006 | Stewart | H02K 1/146 310/216.132 |
| 2007/0074586 | A1 * | 4/2007 | Akutsu | G01D 5/24476 73/862 |
| 2009/0212655 | A1 * | 8/2009 | Miyairi | H02K 5/10 310/216.118 |
| 2010/0308687 | A1 * | 12/2010 | George | H02K 1/185 310/216.135 |
| 2011/0169382 | A1 * | 7/2011 | Coleman | H02K 24/00 310/68 B |
| 2012/0001515 | A1 * | 1/2012 | Kudose | H02K 1/16 310/216.009 |
| 2012/0262033 | A1 * | 10/2012 | Yasuda | H02K 1/28 29/598 |
| 2013/0106252 | A1 * | 5/2013 | Yanagida | H02K 11/225 310/68 B |
| 2013/0187517 | A1 * | 7/2013 | Asao | H02K 5/04 310/68 D |
| 2013/0207509 | A1 * | 8/2013 | Shimaguchi | H02K 1/185 310/216.113 |
| 2013/0249356 | A1 | 9/2013 | Nakano et al. | |
| 2014/0070672 | A1 * | 3/2014 | Gale | G01B 7/30 324/207.16 |
| 2014/0197705 | A1 * | 7/2014 | Sato | H02K 1/185 310/91 |
| 2014/0333163 | A1 * | 11/2014 | Horii | H02K 9/10 310/59 |
| 2015/0076940 | A1 * | 3/2015 | Ohashi | H02K 5/04 310/58 |
| 2015/0216083 | A1 | 7/2015 | Kanazawa et al. | |
| 2017/0174195 | A1 | 6/2017 | Sagayama | |
| 2017/0284396 | A1 * | 10/2017 | Fukasaku | F04C 21/00 |
| 2018/0097421 | A1 * | 4/2018 | Abe | H02K 3/32 |
| 2018/0138762 | A1 * | 5/2018 | Jeong | H02K 5/203 |
| 2018/0159411 | A1 * | 6/2018 | Ryu | H02K 24/00 |
| 2018/0316235 | A1 * | 11/2018 | Yamada | H02K 15/10 |
| 2018/0323691 | A1 * | 11/2018 | Nakano | H02K 1/146 |
| 2019/0199187 | A1 * | 6/2019 | Kaneta | G01B 7/30 |
| 2019/0326799 | A1 * | 10/2019 | Kaneko | H02K 11/02 |
| 2020/0144882 | A1 * | 5/2020 | Tang | H02K 1/185 |
| 2022/0224205 | A1 * | 7/2022 | Angel | B60K 6/485 |

FOREIGN PATENT DOCUMENTS

| | | |
|---|---|---|
| JP | 2001-169500 A | 6/2001 |
| JP | 3210616 U | 6/2017 |
| WO | 2012/120588 A1 | 9/2012 |
| WO | 2014/188803 A1 | 11/2014 |

OTHER PUBLICATIONS

Communication dated Jun. 14, 2022 from the Japanese Patent Office in Application No. 2020-560696.
Office Action issued Aug. 2, 2024 in Chinese Application No. 201880100062.6.

* cited by examiner

ROTATING ELECTRICAL MACHINE WITH STATOR WITH ANNULAR SHAPED MEMBERS BETWEEN FRAME AND STATOR CORE AND HAVING INTEGRATED CONTROL DEVICE FOR VEHICLES

CROSS REFERENCE TO RELATED APPLICATIONS

This application is a National Stage of International Application No. PCT/JP2018/046773 filed Dec. 19, 2018.

TECHNICAL FIELD

The present application relates to a rotating electrical machine with integrated control device for vehicles in which a rotating electrical machine main body and a control device for controlling the rotating electrical machine are integrated.

BACKGROUND ART

Conventionally, a control device for controlling the rotating electrical machine and a rotating electrical machine are integrated, and a rotating electrical machine with an integrated control device for a vehicle mounted on a vehicle is well known, as disclosed in, for example, Patent Literature 1. The stator of the rotating electrical machine is held on the inner peripheral surface of the frame of the rotating electrical machine, and the rotor is mounted inside the stator.
[Patent Literature 1] WO2014/188803 A1

DISCLOSURE OF INVENTION

Technical Problem

There is a demand for weight reduction in the rotating electrical machine with integrated control device mounted in vehicles in order to improve fuel efficiency.

Further, the rotating electrical machine with integrated control device is often mounted and used in the engine room of a vehicle, and is required to have durability against temperature changes and vibrations.

Further, since the space where it can be mounted in the engine room is limited, a reduction of the radial dimension of the rotating electrical machine is required.

Since the stator of the rotating electrical machine is fixed to the inner peripheral surface of the frame of the rotating electrical machine, as the outer diameter of the stator is set bigger than the inner diameter of the frame so that the holding force for holding the stator on the frame becomes a predetermined holding force, it is necessary to tighten the stator with the frame.

If the frame is made of aluminum-based material, the weight can be reduced at low cost. However, since the stator is formed by laminating electrical steel sheets having relatively high hardness, the laminated electrical steel sheets are formed on the contact surface of the stator with the frame due to the lamination, and many steps are formed between them. Therefore, when the stator is fixed to the frame, if the stator is directly press-fitted into the frame, the frame made of an aluminum-based material having low hardness is scraped by the edges generated in the many steps, and the frame becomes damaged.

It is possible to fix the stator to the frame by using the shrink fitting combined method, but in order to adopt the shrink fitting combined method, a separate equipment for shrink fitting is required, there is a problem that the manufacturing cost increased due to the equipment cost. Further, in order to increase the holding force with an aluminum-based material having low hardness, it is necessary to make the frame thicker, and there is a problem that the radial dimension of the rotating electrical machine increases.

This application discloses a technique made in view of the above-mentioned circumstances, and it is an object of this application to prevent damage to the frame when the stator is mounted, to improve the holding power to hold the stator, further, to make possible to reduce the size of the rotating electrical machine body in the radial direction.

Solution to Problem

The rotating electrical machine with integrated control device for vehicles disclosed in the present application integrates the rotating electrical machine main body and the control device arranged on the rear side of the rotating electrical machine main body and controlling the rotating electrical machine, the rotating electrical machine main body provides a rotor shaft, a rotor fixed to the rotor shaft, a stator formed by laminating electrical steel sheets and arranged to surround the rotor, a frame arranged to surround the stator and holding the stator, a first annular shape member located between the stator and the frame, and a second annular shape member located between the stator and the first annular shape member, the stator is press-fitted into the frame via the first annular shape member and the second annular shape member.

Advantageous Effects of Invention

As the rotating electrical machine with integrated control device for vehicles disclosed in the present application integrates the rotating electrical machine main body and the control device arranged on the rear side of the rotating electrical machine main body and controlling the rotating electrical machine, the rotating electrical machine main body provides a rotor shaft, a rotor fixed to the rotor shaft, a stator formed by laminating electrical steel sheets and arranged to surround the rotor, a frame arranged to surround the stator and holding the stator, a first annular shape member located between the stator and the frame, and a second annular shape member located between the stator and the first annular shape member, the stator is press-fitted into the frame via the first annular shape member and the second annular shape member, it is possible to prevent damage to the frame when the stator is assembled, improve the holding force for holding the stator, and further reduce the size of the rotating electrical machine main body in the radial direction.

DESCRIPTION OF EMBODIMENTS

Hereinafter, embodiments of the rotating electrical machine with integrated control device for vehicles according to the present application will be described with reference to the drawings.

Note that the present application is not limited to the following description, and can be appropriately modified without departing from the summary of the present application. In the following drawings, for easy understanding, the scales of the respective members may be different from the actual scales, and illustration of configurations not related to the features of the present application is omitted.

The first to five embodiments of the present application show an example of applying a rotating electrical machine with integrated control device for vehicles to electric power steering mounted on a vehicle, and consists of a rotating electrical machine main body that assists the steering force of the steering of the vehicle and a control device for controlling the rotating electrical machine.

Hereinafter, the first to five embodiments of the present application will be described in order with reference to FIGS. 1 to 10.

First Embodiment

The first embodiment of the present invention will be described below with reference to FIGS. 1 to 4.

Figure 1:
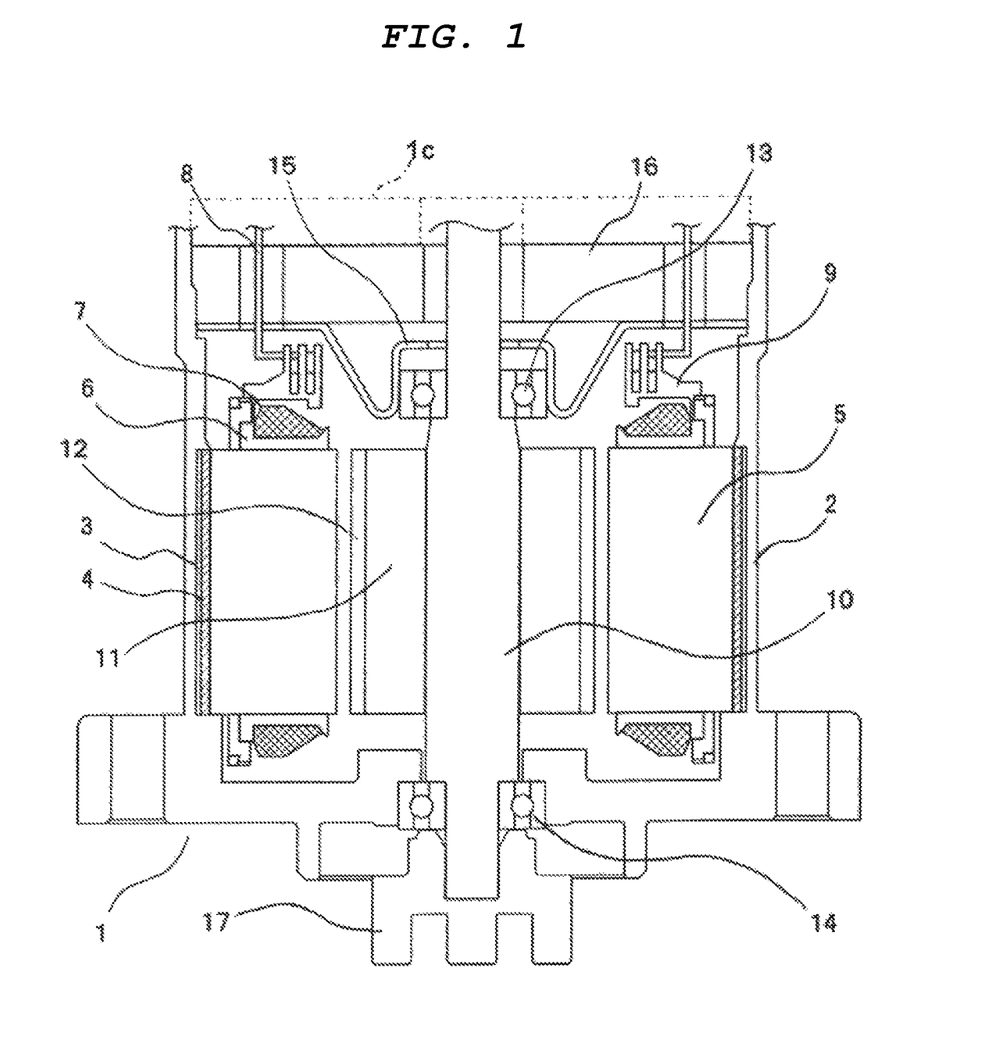
FIG. 1 is a diagram showing a first embodiment of the present application, and is a cross-sectional view showing an example of a rotating electrical machine with integrated control device for vehicles.

FIG. 1 is a cross-sectional view for explaining an example of the configuration of a rotating electrical machine main body of a rotating electrical machine with integrated control device for vehicles.

In FIG. 1, a first annular shape member 3 is installed on the inner peripheral surface of a cylindrical frame 2 of a rotating electrical machine main body 1. A second annular shape member 4 is installed on the inner peripheral surface of the first annular shape member 3. A stator 5 is installed on the inner peripheral surface of the second annular shape member 4.

The frame 2 is made of an inexpensive and lightweight aluminum alloy.

Both the first annular shape member 3 and the second annular shape member 4 are made of carbon steel.

The stator 5 is formed by laminating electrical steel sheets and is arranged so as to surround a rotor 11.

The first annular shape member 3 is metal-bonded to the frame 2.

The second annular shape member 4 is press-fitted into the first annular shape member 3.

By press-fitting the stator 5 into the inner peripheral surface of the second annular shape member 4, the stator 5 is press-fitted into the frame 2 via the second annular shape member 4 and the first annular shape member 4.

A bearing holder 15 that holds a bearing 13 is arranged in the space between the stator 5 and the rotor 11 and a heat sink 16.

By press-fitting the heat sink 16 into the inner peripheral surface of the frame 2, the heat sink 16 is attached to the side (hereinafter referred to as the rear side) opposite to a boss 17 on the load side (hereinafter referred to as the front side) of the frame 2.

A control device 1c for controlling the rotating electrical machine is arranged on the rear side of the rotating electrical machine main body 1. Specifically, the control device 1c is attached to the heat sink 16 on the rear side thereof, is thermally connected to the heat sink 16, and is electrically insulated. As it is well known, the control device 1c includes a power conversion circuit (not shown) that performs power conversion between the stator winding and external DC power, and a control circuit (not shown) for controlling the power conversion circuit.

As it is well known, the stator 5 is wound with a stator winding 7 via an insulator 6 which is an insulator.

A holder 9 for fixing a terminal 8 for supplying the current from the control device 1c to the stator winding 7 is arranged in the space between the stator 5 and the heat sink 16.

A rotor 11 is fixed to a rotor shaft 10. A magnet 12 facing the inner peripheral surface of the stator 5 is installed on the outer periphery of the rotor 11.

The rotor shaft 10 is rotatably supported by the bearing 13 on the rear side and a bearing 14 on the front side.

A rotation angle detection sensor (not shown) for detecting the rotational state of the rotor 11 is installed at the rear end of the rotor shaft 10 in the rear direction. A resolver, a Hall effect IC, a MR sensor, are used as a rotation angle detection sensor.

The boss 17 for assembling with the vehicle side is provided at the front end of the rotating electrical machine main body 1.

Figure 2:
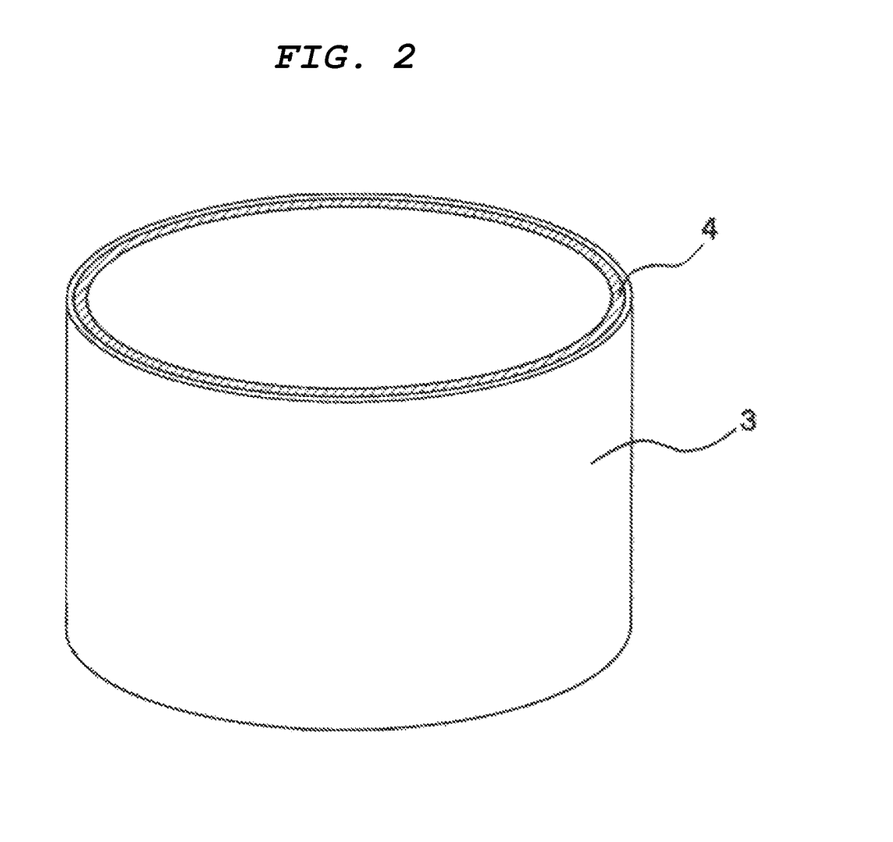
FIG. 2 is a diagram showing a first embodiment of the present application, and is a perspective view showing a first annular shape member and a second annular shape member of the rotating electrical machine with integrated control device for vehicles illustrated in FIG. 1.

FIG. 2 is a perspective view illustrating the first annular shape member 3 and the second annular shape member 4 of the rotating electrical machine illustrated in FIG. 1. As an example, the first annular shape member 3 is formed of carbon steel having a thickness of 0.5 mm, and the second annular shape member 4 is formed of carbon steel having a thickness of 1.5 mm.

Figure 3:
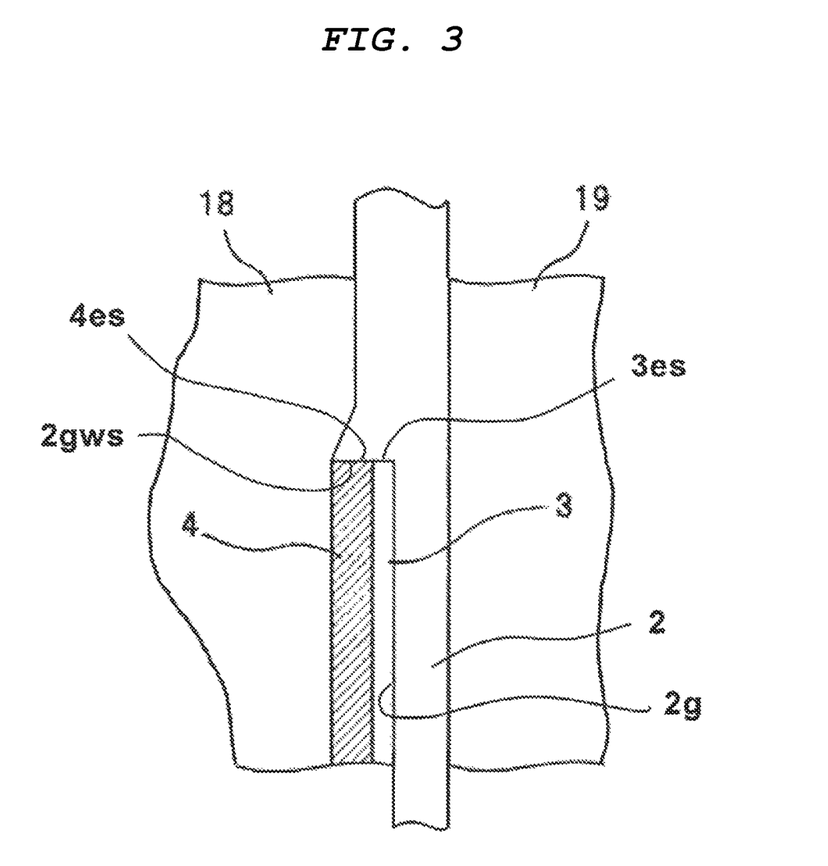
FIG. 3 is a diagram showing a first embodiment of the present application, and is a cross-sectional view of the structure for explaining manufacturing method of the frame of the rotating electrical machine with integrated control device for vehicles illustrated in FIG. 1.

FIG. 3 is a cross-sectional view showing a structure for explaining manufacturing method of the frame 2 of the rotating electrical machine main body 1 according to the present embodiment.

A medium mold 18 for injection molding is formed according to the shape inside the frame 2. The first annular shape member 3 and the second annular shape member 4 press-fitted into the first annular shape member 3 are installed on the medium-sized mold 18 as illustrated in FIG. 3.

A external mold 19 for injection molding is formed according to the outer shape of the frame 2.

The molten metal of ADC12, which is an aluminum alloy defined in JIS (Japanese Industrial Standard), is pressurized, and the pressurized molten metal is injected between the medium mold 18 and the external mold 19. As illustrated in FIG. 3, the injected molten metal of ADC12 is filled in the space formed when the first annular shape member 3, the second annular shape member 4, and the external mold 19 are incorporated into a relatively opposed state. The filled molten metal is cooled and solidified to form the frame 2. As illustrated in FIG. 3, the frame 2 is located between the medium mold 18 and the external mold 19 on which the first annular shape member 3 and the annular shape member 4 are installed. As illustrated in FIG. 3, an annular shape ditch 2g is formed inside the frame 2. The first annular shape member 3 and the second annular shape member 4 are arranged in the annular ditch 2g.

On a wall surface 2gws at both ends in the axial direction of the annular ditch of the frame 2, an end surface 3es at both ends in the axial direction of the first annular shape member 3 and an end surface 4es at both ends in the axial direction of the second annular shape member 4 face each other in the axial direction. After that, the medium mold 18 and the external mold 19 are separated. By separating the medium mold 18 and the external mold 19, the frame 2 in which the first annular shape member 3 and the second annular shape member 4 are cast is formed.

By such a structure process, by integrally forming the frame 2, the first annular shape member 3 and the second annular shape member 4, the first annular shape member is formed when the rotating electrical machine main body 1 is assembled, the step of press-fitting the annular shape member 3 and the second annular shape member 4 into the frame 2 can be suppressed. Further, since the frame 2 can be processed in a state where the frame 2, the first annular shape member 3 and the second annular shape member 4 are press-fitted, the dimensional accuracy is improved.

By the way, in the structure process of the frame 2, a metal bond is formed between the outer peripheral surface of the first annular shape member 3 in contact with the molten metal and the inner peripheral surface of the frame 2. Therefore, in the process of cooling and solidifying the molten metal, according to the difference of the coefficient of linear expansion of the frame 2 made of aluminum alloy and the coefficient of linear expansion of the first annular shape member 3 made of carbon steel, stress is generated in both the frame 2 and the first annular shape member 3. Therefore, the strength of the aluminum alloy is lower than that of carbon steel, and deformation and cracking are likely to occur. Therefore, the frame 2 needs to have a plate thickness for ensuring sufficient rigidity with respect to the plate thickness of the first annular shape member 3, which causes a problem of preventing thinning. Further, if the plate thickness of the first annular shape member 3 is reduced in order to reduce the wall thickness of the frame 2, there is a problem in which the holding force for holding the stator 5 is lowered.

In view of the above-mentioned problems, in the example of the present embodiment, the thickness of the frame 2 can be reduced by reducing the plate thickness of the first annular shape member 3 to which the frame 2 and its outer circumference are joined, further, by installing the second annular shape member 4 having a large plate thickness on the inner circumference of the first annular shape member 3, it is possible to obtain a holding force having a size sufficient to hold the stator 5. As illustrated in FIG. 3, the upper and lower end faces 4es in the axial direction of the second annular shape member 4 are also metal-bonded to the frame 2, but as it is local, deformation and cracking of the frame 2 is not a problem.

The first annular shape member 3 may be formed of a material other than carbon steel having a melting point higher than that of ADC12, for example, other aluminum alloys such as JIS standard aluminum alloys A3003 and A5005.

Figure 4:
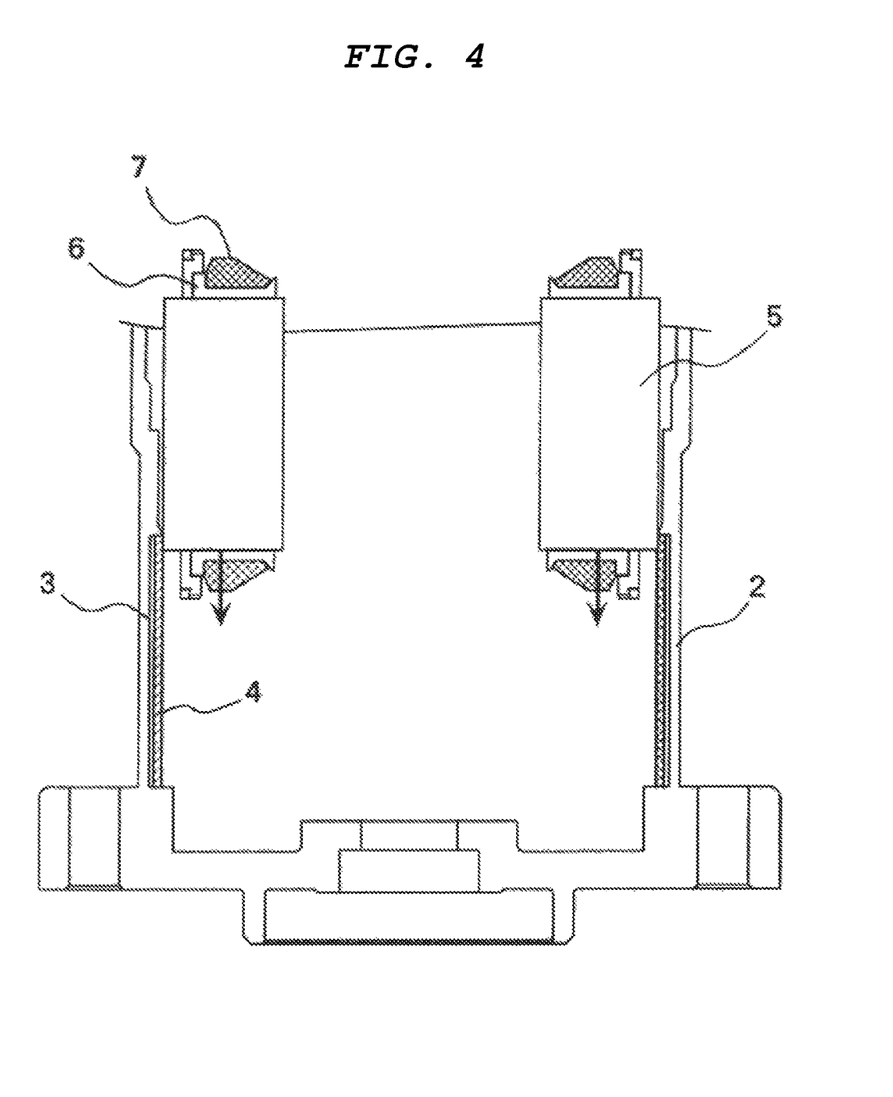
FIG. 4 is a diagram showing a second embodiment of the present application, and is a cross-sectional view of a part of the assembly process of the rotating electrical machine with integrated control device for vehicles illustrated in FIG. 1.

FIG. 4 is a cross-sectional view showing a step of press-fitting the stator 5 into the frame 2 in the rotating electrical machine main body 1 which is an example of the present embodiment.

As illustrated in FIG. 4, in the step of press-fitting the stator 5 into the frame 2, according to the configuration of the present application, the stepped part of the stator 5 formed by laminating electrical steel sheets due to the laminating described above comes into contact with the inner peripheral surface of the second annular shape member 4 made of carbon steel having high hardness. Therefore, in the step of press-fitting the stator 5 into the frame 2 by press-fitting the stator 5 into the aluminum alloy frame 2 via the first annular-shape member 3 and the second annular-shape member 4, damage to the frame 2 due to press-fitting of the stator 5 can be prevented, and since it is not necessary to adopt the shrink fitting combined method, the shrink fitting equipment can be suppressed and the equipment cost can be reduced.

Second Embodiment

Figure 5:
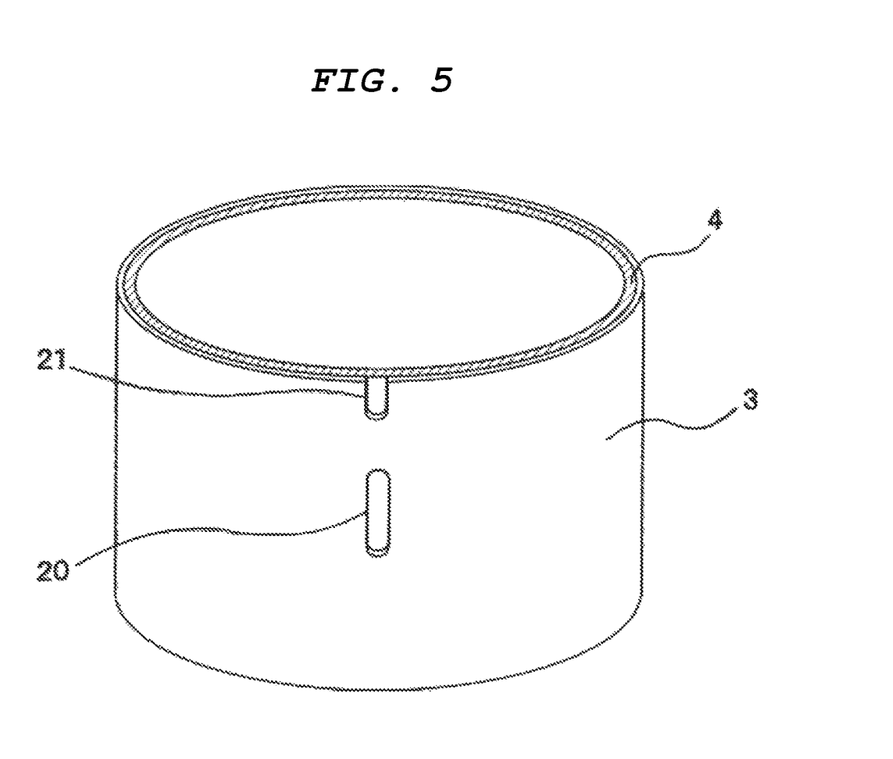
FIG. 5 is a diagram showing a second embodiment of the present application, and is a perspective view of another annular shape member that applies to the rotating electrical machine with integrated control device for vehicles illustrated in FIG. 1.

FIG. 5 is a perspective view showing another example of the first annular shape member 3 and the second annular shape member 4 of the present embodiment. In the second embodiment, the same or corresponding parts as those in the first embodiment are partially omitted, the description is omitted, and only the main parts are illustrated and described.

In FIG. 5, a through hole 20 and a notch 21 are formed in a part of the side surface of the first annular shape member 3.

When casting the first annular shape member 3 and the second annular shape member 4 into the frame 2, at the through hole 20 and the notch 21, the outer peripheral surface of the second annular shape member 4 is metal-bonded to the frame 2 and fixed, the stator 5 is attached to the frame 2 via the first annular shape member 3 and the second annular shape member 4, in the press-fitted structure, the above-mentioned holding force in the axial direction (vertical direction in FIG. 1) and the rotational direction about the axial direction can be improved. The metal joint between the second annular shape member 4 and the frame 2 is locally limited, and deformation and cracking of the frame 2 can be prevented. Even if only one of the through hole 20 and the notch 21 is formed, or if each is formed at a plurality of places, the same effect can be obtained.

Third Embodiment

Figure 6:
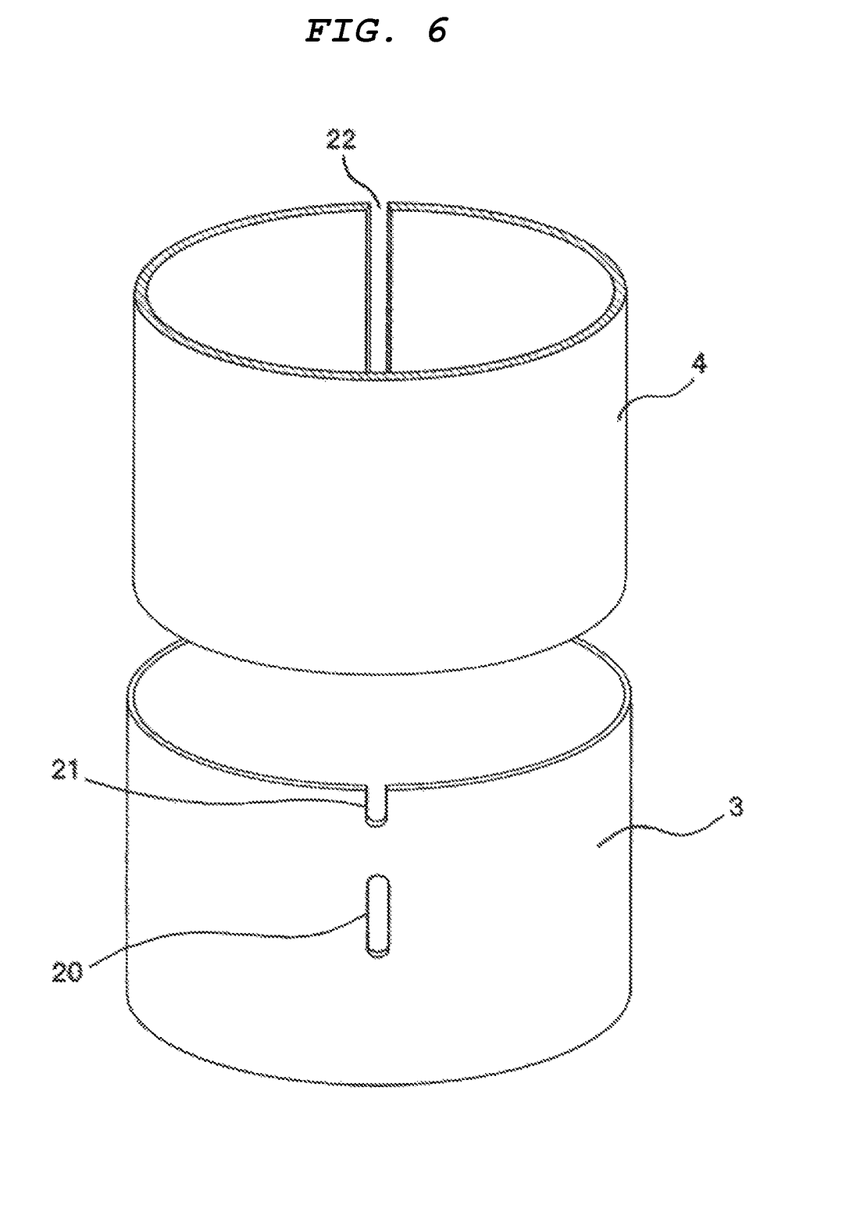
FIG. 6 is a diagram showing a third embodiment of the present application, and is a perspective view of another annular shape member that applies to the rotating electrical machine with integrated control device for vehicles illustrated in FIG. 1.

FIG. 6 is a diagram illustrating the third embodiment, and is a perspective view showing another example of the first annular shape member 3 and the second annular shape member 4. In the third embodiment, the same or corresponding parts as those in the first and second embodiments are partially omitted, the description is omitted, and only the main parts are illustrated and described.

In FIG. 6, a notch 22 penetrating from one end to the other end in the axial direction is formed at a part of the second annular shape member 4 that does not come into contact with the through hole 20 and the notch 21 of the first annular shape member 3. Due to the formation of the notch 22, when the second annular shape member 4 is press-fitted into the first annular shape member 3, it can be press-fitted while applying a load in the direction of reducing the diameter of the second annular shape member 4, it is possible to reduce the pressure input when the second annular shape member 4 is press-fitted into the first annular shape member 3, and the assembly is easier.

Fourth Embodiment

The rotating electrical machine with integrated control device for vehicles according to the fourth embodiment of the present application will be described with reference to FIGS. 7 and 8. Similarly to the first embodiment, the fourth embodiment also shows an example applied to the electric power steering mounted on the vehicle, and includes a rotating electrical machine main body and a control device. In the fourth embodiment, the same or corresponding parts as those in the first to third embodiments are partially omitted, the description is omitted, and only the main parts are illustrated and described.

Figure 7:
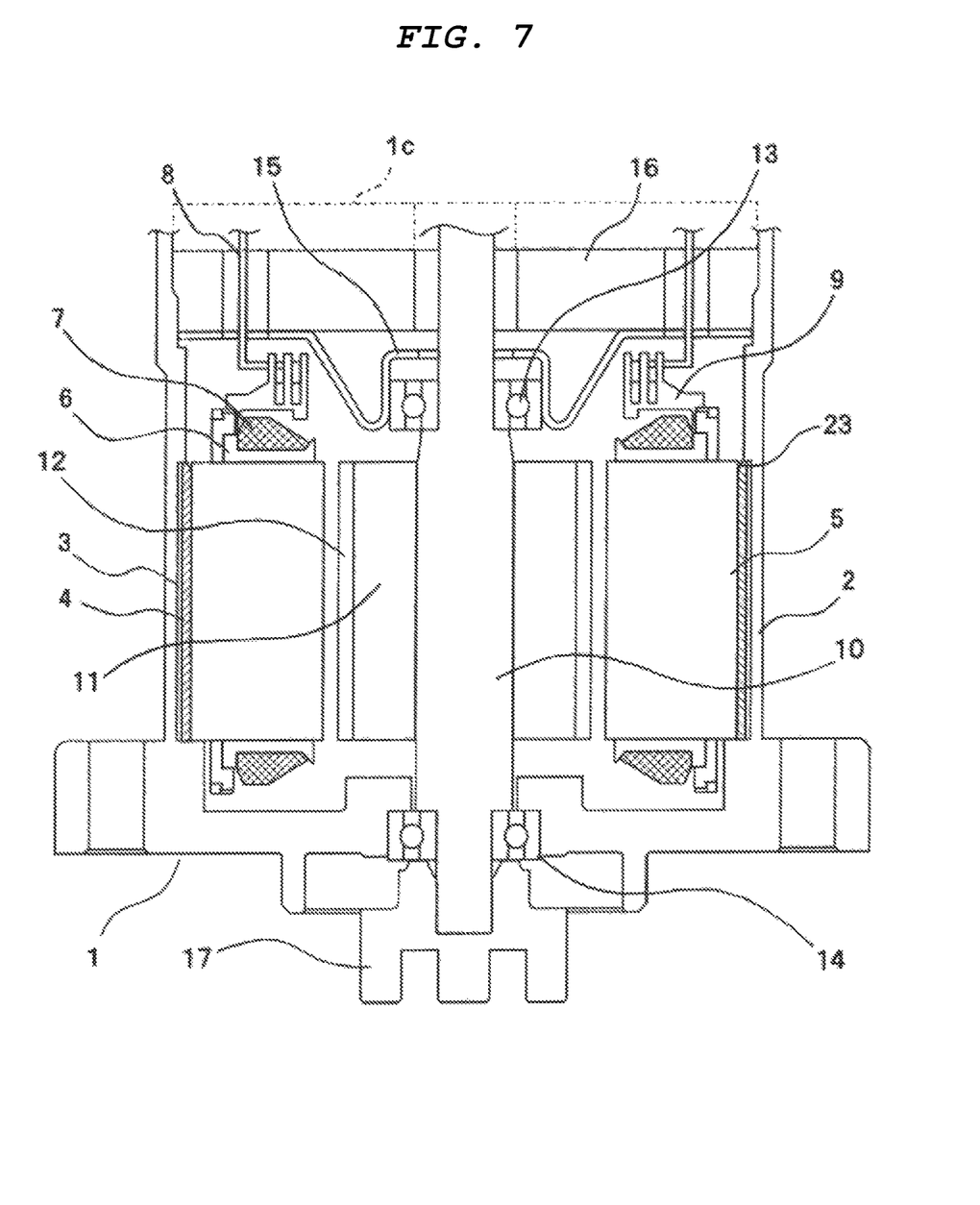
FIG. 7 is a diagram showing a fourth embodiment of the present application and is a cross-sectional view of another example of the rotating electrical machine.

FIG. 7 is a cross-sectional view for explaining another configuration of the rotating electrical machine main body of the rotating electrical machine with integrated control device for vehicles.

Similarly to FIG. 1, the first annular shape member 3 is installed on the inner peripheral surface of the frame 2 of the rotating electrical machine main body 1, the second annular shape member 4 is installed on the inner peripheral surface of the first annular shape member 3, the stator 5 is installed on the inner peripheral surface of the second annular shape member 4.

The frame 2 is made of an inexpensive and lightweight aluminum alloy, the first annular shape member 3 and the second annular shape member 4 are made of carbon steel, the stator 5 is formed by laminating electrical steel sheets.

The outer peripheral surface of the first annular shape member 3 is metal-bonded to the frame 2, the stator 5 is installed by being press-fitted into the frame 2 via the first annular shape member 3 and the second annular shape member 4.

In the example of the present embodiment, a taper 23 is formed on the end surface 4es of the second annular shape member 4 in the direction of the inner circumference of the annular shape, the inner peripheral surface of the second annular shape member 4 projects in the inner direction of the frame 2 (left direction in FIG. 8) from the end surface 4es.

The first annular shape member 3 is made of carbon steel having a thickness of 0.5 mm, and the second annular shape member 4 is made of carbon steel having a thickness of 1.5 mm.

The end surface 4es of the second annular shape member 4 on the control device 1c side is provided with the taper 23 toward the inner circumference of the annular shape, leaving a flat part of 0.7 mm. The second annular shape member 4 is press-fitted into the first annular shape member 3, so that the first annular shape member 3 and the second annular shape member 4 are integrated.

Figure 8:
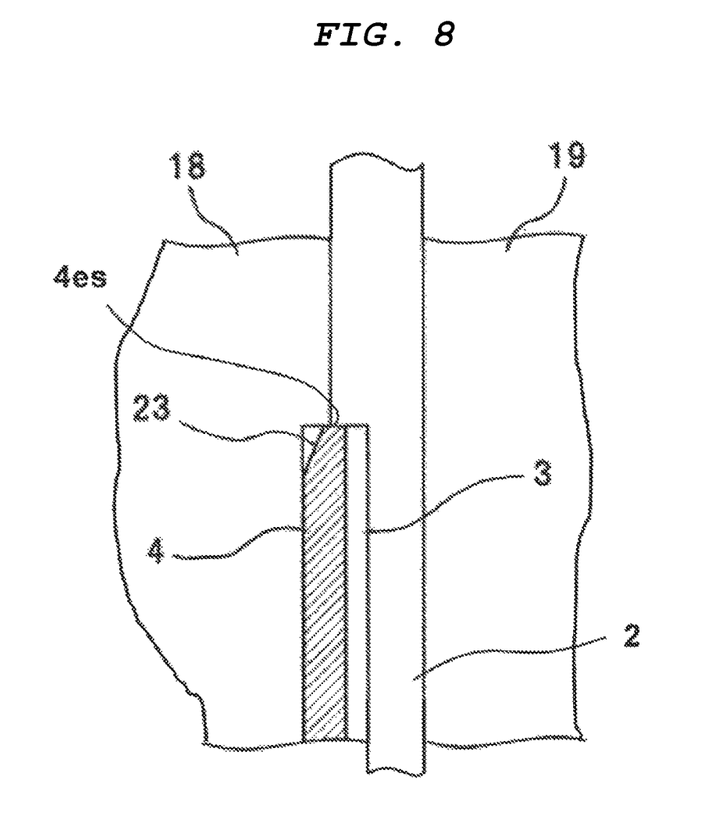
FIG. 8 is a diagram showing a fourth embodiment of the present application, and is a cross-sectional view of the structure for explaining manufacturing method of the frame of the rotating electrical machine with integrated control device for vehicles illustrated in FIG. 7.

FIG. 8 is a cross-sectional view showing a structure for explaining manufacturing method of the frame of the rotating electrical machine of the present embodiment.

The medium mold 18 is formed according to the shape inside the frame 2, and the first annular shape member 3 and the second annular shape member 4 are installed on the medium mold 18.

The external mold 19 is formed to match the outer shape of the frame 2.

The molten metal of ADC12, which is an aluminum alloy defined in JIS is pressurized, and the pressurized molten metal is injected between the medium mold 18 and the external mold 19. As illustrated in FIG. 8, the injected molten metal of ADC12 is filled in the space formed when the first annular shape member 3, the second annular shape member 4, and the external mold 19 are incorporated into a relatively opposed state. The filled molten metal is cooled and solidified to form the frame 2. As illustrated in FIG. 8, the frame 2 is located between the medium mold 18 and the external mold 19 on which the first annular shape member 3 and the annular shape member 4 are mounted. After that, the medium mold 18 and the external mold 19 are separated. By separating the medium mold 18 and the external mold 19, the frame 2 in which the first annular shape member 3 and the second annular shape member 4 are cast is formed.

In the example of this embodiment, in the frame 2 formed by integrally casting the first annular shape member 3 and the second annular shape member 4, by reducing the plate thickness of the first annular shape member 3 whose outer circumference is joined to the frame, it allows the frame 2 to be thinner, further, by installing the second annular shape member 4 having a plate thickness on the inner circumference larger than the one of the first annular shape member 3, it is possible to obtain a holding force having a size sufficient to hold the stator 5.

According to the configuration of the present application, the stepped part of the stator 5 formed by laminating electrical steel sheets due to the laminating described above comes into contact with the inner peripheral surface of the second annular shape member 4 made of carbon steel having high hardness. Therefore, in the step of press-fitting the stator 5 into the frame 2 by press-fitting the stator 5 into the aluminum alloy frame 2 via the first annular-shape member 3 and the second annular-shape member 4, damage to the frame 2 due to press-fitting of the stator 5 can be prevented.

The stator 5 and the second annular shape member 4 are in a press-fitting relationship, and the outer diameter of the stator 5 is larger than the diameter of the inner circumference of the second annular shape member 4. Therefore, when the stator 5 is press-fitted into the second annular shape member 4, when the bottom surface and corners of the outer peripheral end of the stator 5 come into contact with the inner peripheral surface of the frame 2 or the end surface of the second annular shape member 4, the inner peripheral surface of the frame 2 or the end surface of the second annular shape member 4 may be deformed or damaged. As in the example of this embodiment, the inner peripheral surface of the second annular shape member 4 is projected toward the inside of the frame 2, by forming the taper 23 on the end face of the second annular shape member 4, it is possible to prevent damage to the inner peripheral surface of the frame 2 or the end surface of the second annular shape member 4 when the stator 5 is press-fitted into the second annular shape member 4.

Fifth Embodiment

Figure 9:
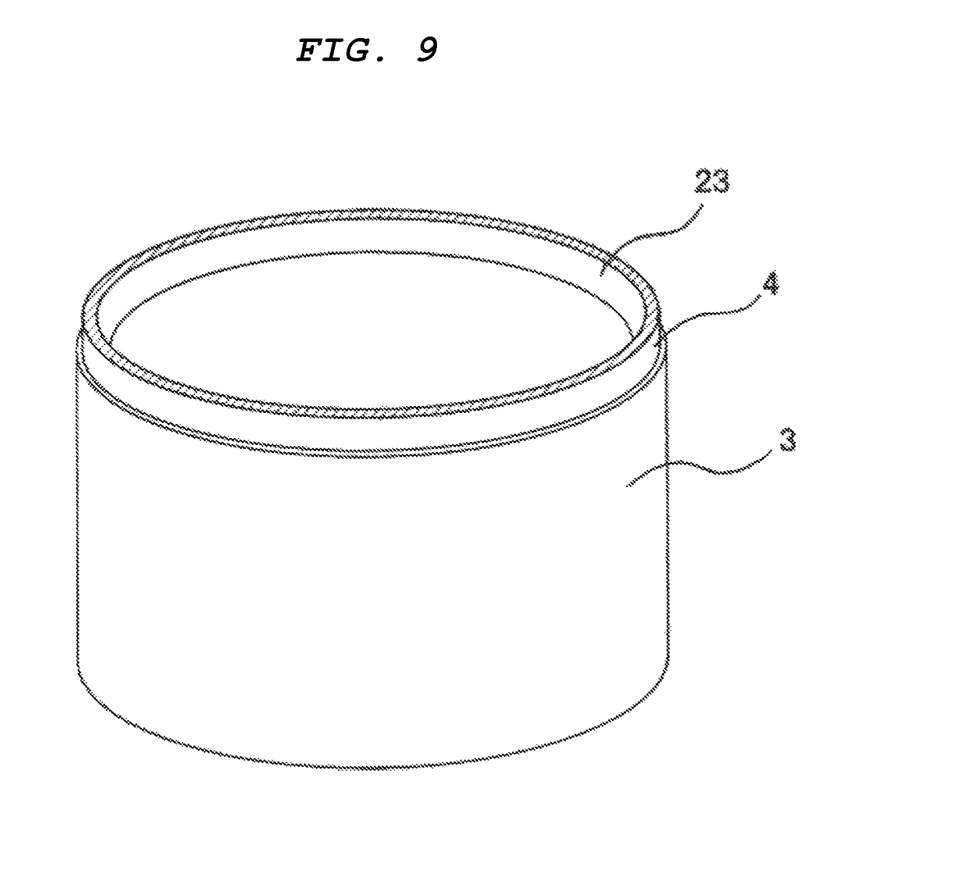
FIG. 9 is a diagram showing the fifth embodiment of the present application, and is a perspective view of another annular shape member that applies to the rotating electrical machine with integrated control device for vehicles illustrated in FIG. 7.
Figure 10:
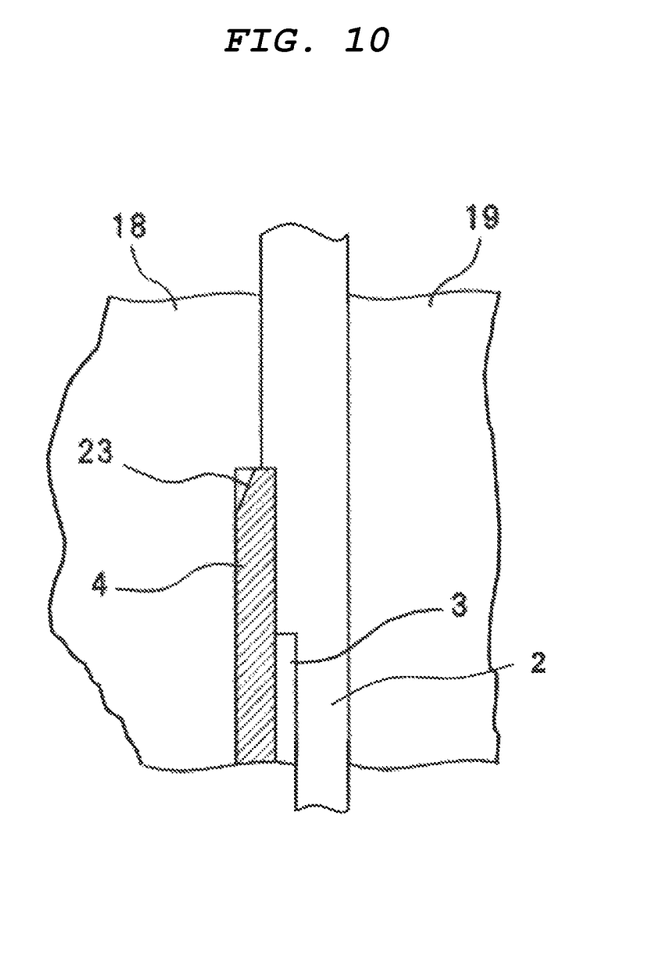
FIG. 10 is a diagram showing a first embodiment of the present application, and is a cross-sectional view of another structure for explaining another manufacturing method of the frame of the rotating electrical machine with integrated control device for vehicles illustrated in FIG. 7.

FIG. 9 is a diagram illustrating the fifth embodiment, and is a perspective view showing another example of the first annular shape member 3 and the second annular shape member 4, FIG. 10 is a diagram illustrating a structure for explaining manufacturing method of the frame 2 in which the first annular shape member 3 and the second annular shape member 4 are cast in the fifth embodiment. In the fifth embodiment, the same or corresponding parts as those in the first to fourth embodiments are partially omitted, the description is omitted, and only the main parts are illustrated and described.

The first annular shape member 3 is made of carbon steel having a thickness of 0.5 mm, and the second annular shape member 4 is made of carbon steel having a thickness of 1.5 mm.

The end face 4es on the control device (1c in FIG. 7) side of the second annular shape member 4 is provided with the taper 23 toward the inner circumference of the annular shape leaving a flat part of 0.7 mm.

The axial length of the first annular shape member 3 is shorter than the axial length of the second annular shape member 4, the second annular shape member 4 and the first annular shape member 3 are relatively press-fitted, the end of the second annular shape member 4 on the control device (1c in FIG. 7) side, in other words, the rear side, is protruding from the end of the first annular shape member 3 on the control device (1c in FIG. 7) side to the rear side.

The medium mold 18 is formed according to the shape inside the frame 2, and the first annular shape member 3 and the second annular shape member 4 are installed on the medium mold 18.

The external mold 19 is formed to match the outer shape of the frame 2.

The molten metal of ADC12, which is an aluminum alloy defined in JIS is pressurized, and the pressurized molten metal is injected between the medium mold 18 and the external mold 19. As illustrated in FIG. 8, the injected molten metal of ADC12 is filled in the space formed when the first annular shape member 3, the second annular shape member 4, and the external mold 19 are incorporated into a relatively opposed state. After the filled molten metal is cooled and solidified, the medium mold 18 and the external mold 19 are separated.

Since the outer peripheral surface of the second annular shape member 4 protruding from the first annular shape member 3 to the rear side in the axial direction is metal-bonded to the frame 2 and fixed to the frame 2, in a structure in which the stator 5 is press-fitted into the frame 2 via the first annular shape member 3 and the second annular shape member 4, the above-mentioned holding force in the axial direction (vertical direction in FIG. 7) and the rotational direction in the axial direction can be improved. Since only a part of the second annular shape member 4 is metal-bonded to the frame 2, deformation and cracking of the frame 2 can be prevented.

The first annular shape member 3 may be formed of a material other than carbon steel having a melting point higher than that of ADC12, for example, other aluminum alloys such as JIS standard aluminum alloys A3003 and A5005.

As described above, in the rotating electrical machine main body 1 of the present embodiment, the frame 2 integrally formed by casting the first annular shape member 3 and the second annular shape member 4 installed on the inner peripheral side of the first annular shape member 3 into an aluminum-based material, the stator 5 is press-fitted via the first annular shape member 3 and the second annular shape member 4. As a result, at the time of press-fitting, the stepped part due to the lamination of the stator 5 comes into contact with the inner peripheral surface of the second annular shape member 4 formed of carbon steel having high hardness, damage to the frame 2 due to direct contact with the stator 5 can be prevented, and the equipment cost for shrink fitting can be reduced. Further, the thickness of the first annular shape member whose outer peripheral surface is metal-bonded to the frame 2 is reduced, by making the plate thickness of the second annular shape member 4 larger than the plate thickness of the first annular shape member, even if the frame 2 is thinned, the holding force of the stator can be improved while preventing the frame 2 from being deformed or cracked. This makes it possible to reduce the radial dimension of the rotating electrical machine main body 1.

All of the above-described first to fifth embodiments can be applied to vehicles such as automobiles, motorcycles, motorized bicycles, motor boats, snowmobiles, and airplanes.

In the drawings, the same reference numerals indicate the same or corresponding parts.

Although various exemplary embodiments and examples are described in this application, the various features, modes, and functions described in one or more embodiments are not limited to the application of a particular embodiment, but can be applied to embodiments alone or in various combinations.

Accordingly, countless variations not illustrated are envisioned within the scope of the art disclosed in this application. For example, this shall include cases where at least one component is transformed, added or omitted, and even where at least one component is extracted and combined with components of other embodiments.

REFERENCE SIGNS LIST

1: Rotating electrical machine main body
1c: Control device
2: Frame
2g: Ditch
2gws: Wall surface
3: First annular shape member
3es: End surface
4: Second annular shape member
4es: End surface
5: Stator
6: Insulator
7: Stator winding
8: Terminal
9: Holder
10: Rotor shaft
11: Rotor
12: Magnet
13: Bearing
14: Bearing
15: Bearing holder
16: Heat sink
17: Boss
18: Medium mold 19: External mold
20: Through hole
21: Notch
22: Notch
23: Taper

The invention claimed is:

1. The rotating electrical machine with integrated control device for vehicles wherein:
a rotating electrical machine main body and a control device for controlling the rotating electrical machine are integrated,
the rotating electrical machine main body comprising;
a rotor shaft,
a rotor fixed to the rotor shaft,
a stator formed by laminating electrical steel sheets and arranged so as to surround the rotor,
a frame arranged so as to surround the stator and holding the stator,
a first annular shape member located between the stator and the frame, and
a second annular shape member located between the stator and the first annular shape member, wherein
the stator is press-fitted into the frame via the first annular shape member and the second annular shape member, and
the first annular shape member and the second annular shape member are positioned within a same ditch of the frame.

2. The rotating electrical machine with integrated control device for vehicles according to claim 1, wherein;
a notch is formed at at least one end surface of the first annular shape member, and an outer peripheral surface of the second annular shape member and the frame are metal-bonded through the notch.

3. The rotating electrical machine with integrated control device for vehicles according to claim 1, wherein;
at least one notch penetrating from one end to the other end in an axial direction of the second annular shape member is formed.

4. The rotating electrical machine with integrated control device for vehicles according to claim 1, wherein;
the outer peripheral surface of the second annular shape member protruding in the axial direction from the first annular shape member and the frame are metal-bonded.

5. The rotating electrical machine with integrated control device for vehicles according to claim 1, wherein
the first annular shape member and the second annular shape member have a same length in an axial direction of the rotating electrical machine.

6. The rotating electrical machine with integrated control device for vehicles according to claim 1, wherein;
a taper is formed on an inner peripheral side of the end face on a rear side of the second annular shape member.

7. The rotating electrical machine with integrated control device for vehicles according to claim 6, wherein;
the outer peripheral surface of the second annular shape member protruding in the axial direction from the first annular shape member and the frame are metal-bonded.

8. The rotating electrical machine with integrated control device for vehicles according to claim 1, wherein;
a through hole is formed at at least one side surface of the first annular shape member, and an outer peripheral surface of the second annular shape member and the frame are metal-bonded through the through hole.

9. The rotating electrical machine with integrated control device for vehicles according to claim 8, wherein;
a notch is formed at at least one end surface of the first annular shape member, and an outer peripheral surface of the second annular shape member and the frame are metal-bonded through the notch.

10. The rotating electrical machine with integrated control device for vehicles according to claim 8, wherein;
at least one notch penetrating from one end to the other end in an axial direction of the second annular shape member is formed.

11. The rotating electrical machine with integrated control device for vehicles according to claim 1, wherein;
a plate thickness of the second annular shape member is larger than a plate thickness of the first annular shape member.

12. The rotating electrical machine with integrated control device for vehicles according to claim 11, wherein;
a taper is formed on an inner peripheral side of the end face on a rear side of the second annular shape member.

13. The rotating electrical machine with integrated control device for vehicles according to claim 11, wherein;
a through hole is formed at at least one side surface of the first annular shape member, and an outer peripheral surface of the second annular shape member and the frame are metal-bonded through the through hole.

14. The rotating electrical machine with integrated control device for vehicles according to claim 11, wherein;
a notch is formed at at least one end surface of the first annular shape member, and an outer peripheral surface of the second annular shape member and the frame are metal-bonded through the notch.

15. The rotating electrical machine with integrated control device for vehicles according to claim 11, wherein;
at least one notch penetrating from one end to the other end in an axial direction of the second annular shape member is formed.

16. The rotating electrical machine with integrated control device for vehicles according to claim 1, wherein;
both the first annular shape member and the second annular shape member are made of material having a higher hardness than the frame.

17. The rotating electrical machine with integrated control device for vehicles according to claim 16, wherein;
a taper is formed on an inner peripheral side of the end face on a rear side of the second annular shape member.

18. The rotating electrical machine with integrated control device for vehicles according to claim 16, wherein;
a through hole is formed at at least one side surface of the first annular shape member, and an outer peripheral surface of the second annular shape member and the frame are metal-bonded through the through hole.

19. The rotating electrical machine with integrated control device for vehicles according to claim 16, wherein;
a plate thickness of the second annular shape member is larger than a plate thickness of the first annular shape member.

20. The rotating electrical machine with integrated control device for vehicles according to claim 19, wherein;
a taper is formed on an inner peripheral side of the end face on a rear side of the second annular shape member.

21. The rotating electrical machine with integrated control device for vehicles according to claim 19, wherein;
a through hole is formed at at least one side surface of the first annular shape member, and an outer peripheral surface of the second annular shape member and the frame are metal-bonded through the through hole.

* * * * *